United States Patent [19]

Yen

[11] 4,169,751
[45] Oct. 2, 1979

[54] HIGH FREQUENCY BONDING WITH CONCENTRATORS

[75] Inventor: Edward C. Yen, Rochester, N.Y.

[73] Assignee: Eastman Kodak Company, Rochester, N.Y.

[21] Appl. No.: 910,397

[22] Filed: May 30, 1978

[51] Int. Cl.$^2$ .................... B29C 27/08; B32B 32/16
[52] U.S. Cl. .................... 156/73.1; 156/73.4; 156/580.1; 228/1 R; 264/23; 428/167; 428/185
[58] Field of Search .................. 156/73.1, 73.4, 580.1; 228/1 R, 110; 264/23; 428/167, 185

[56] References Cited

U.S. PATENT DOCUMENTS

| | | | |
|---|---|---|---|
| 3,661,661 | 5/1972 | Berleyoung | 156/580 |
| 3,819,437 | 6/1974 | Paine | 156/73.4 |
| 3,874,963 | 4/1975 | Barger | 156/73.2 |
| 3,973,064 | 8/1976 | Paine | 156/73.4 X |
| 3,992,158 | 11/1976 | Przybylowicz et al. | 23/253 TP |
| 4,060,438 | 11/1977 | Johnson | 156/73.1 |

*Primary Examiner*—John T. Goolkasian
*Assistant Examiner*—Robert A. Dawson
*Attorney, Agent, or Firm*—M. S. Sales

[57] ABSTRACT

An article and its method of manufacture is disclosed wherein at least three sheets of thermoplastic web material are bonded to form a laminated unit. Energy director element sets are disposed between adjacent sheets in an orientation such that the director elements of one set are angularly oriented with respect to those of the next adjacent set to define points at which the elements of one set cross the elements of the adjacent set. When a compressive force and high frequency vibratory energy are applied to the unit, the pressure and vibratory energy are concentrated at the defined points so that the thermoplastic material in the region of the concentrated pressure is first to soften. Subsequent application of compressive force and vibratory energy softens the thermoplastic material adjacent the defined points. By initially concentrating the pressure and vibratory energy, the bonding time is substantially reduced and an even flow of material is assured.

9 Claims, 5 Drawing Figures

HIGH FREQUENCY BONDING WITH CONCENTRATORS

BACKGROUND OF THE INVENTION

Cross Reference to Related Applications

Reference is made to commonly assigned, copending U.S. patent application Ser. No. 751,912 entitled CHEMICAL ANALYZER, filed in the names of Louis C. Nosco, Anthony P. DiFulvio and Henry S. Adamski on Dec. 17, 1976.

Field of the Invention

The present invention relates generally to objects laminated of three or more sheets of thermoplastic web material, and to a method for making such objects. Objects in accordance with the present invention are particularly useful for supplying test elements for determining the concentration of a component of body fluid.

Description of the Prior Art

In recent years, a number of automated systems have been developed for carrying out quantitative chemical analysis of fluid samples. Many of the commercially available systems utilize liquid reagents, and require analyzer equipment having intricate solution handling and transport capabilities. However, at least one known fluid analyzing apparatus is adapted to transport discrete test elements containing dry reagents upon which chemical analysis tests are conducted. The test elements are metered through the apparatus and receive a drop of biological fluid to be tested. Apparatus of this type is described in commonly assigned, co-pending U.S. patent application Ser. No. 751,912, entitled CHEMICAL ANALYZER filed on Dec. 17, 1976, while the test elements may be of the type disclosed in co-assigned U.S. Pat. No. 3,992,158, which issued on 11/16/76.

To facilitate handling, a plastic mount is provided to support and carry each test element. The mounts are preferably formed of three sheets of thermoplastic web material bonded together to form a laminated, integral mount with the test element captured therein.

One method which has been used to bond sheets of thermoplastic web material involves stacking the sheets, applying compressive force to the stack, and, at the same time, subjecting the stack to high frequency vibratory energy. The thermoplastic material at the sheet surfaces is melted and flows together and forms a weld joining the sheets. The use of vibratory energy (sound waves of sub-sonic or ultrasonic frequency) to weld thermoplastic materials is commonly known as sonic bonding.

For optimum results in sonic bonding, provision must be made for the release of vibratory energy at the proper place along the joint. Energy director elements have been used in joint design to concentrate the released energy to provide a strong molecular bond between the joined surfaces. Such energy director elements are generally made of the same thermoplastic materials as the parts to be joined, and may be integral projections on one or both of the surfaces to be bonded. Alternatively, the director elements may be separate members placed between those surfaces. An example of such director elements which are integral with the surfaces to be joined is disclosed in U.S. Pat. No. 3,819,437, issued on June 25, 1974 to E. H. Paine. Separate, non-integral director elements placed between the surfaces are shown in U.S. Pat. No. 3,874,963, which issued on Nov. 8, 1973 to M. B. Barger.

In bonding extruded sheets of web material, integral director elements are generally formed as continuous linear ribs on one or both of the sheets during the extrusion process. When only two sheets are to be joined, such director elements work satisfactorily. However, if three sheets are to be joined simultaneously with a first set of linear director elements between the top and middle sheets parallel to a second set of director elements between the middle and bottom sheets, it is likely that the director elements of the second set, although parallel to those of the first set, will not be aligned with (directly below) those of the first set. As such, there will be only a minimum amount of concentration of the compressive force applied to the sheets during application of vibratory energy. While the parallel sets of directors could of course be positioned so that the director elements of the first set are indeed below those of the second set, such a configuration would require special handling and orientation of the sheets before bonding.

SUMMARY OF THE INVENTION

In accordance with the present invention, a laminated object and a method for making such an object are provided wherein at least three sheets of thermoplastic web material are bonded together by high frequency vibratory energy. The sheets are arranged in juxtaposed, stacked relationship with sets of energy director elements between adjacent sheets. The director elements of each set are disposed at an angle with respect to the director elements of the next adjacent set so as to define points at which the director elements of one set cross the director elements of the next adjacent set. When compressive force is applied to the sheets, the greatest pressure is concentrated at the defined points so that vibratory energy tends to soften the thermoplastic material first at those points. One particularly useful application for articles formed in accordance with the present invention is as mounts for analytical test elements to be used for quantitative chemical analysis of fluid samples.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which.

DESCRIPTION OF THE PREFERRED EMBODIMENT

Figure 1:
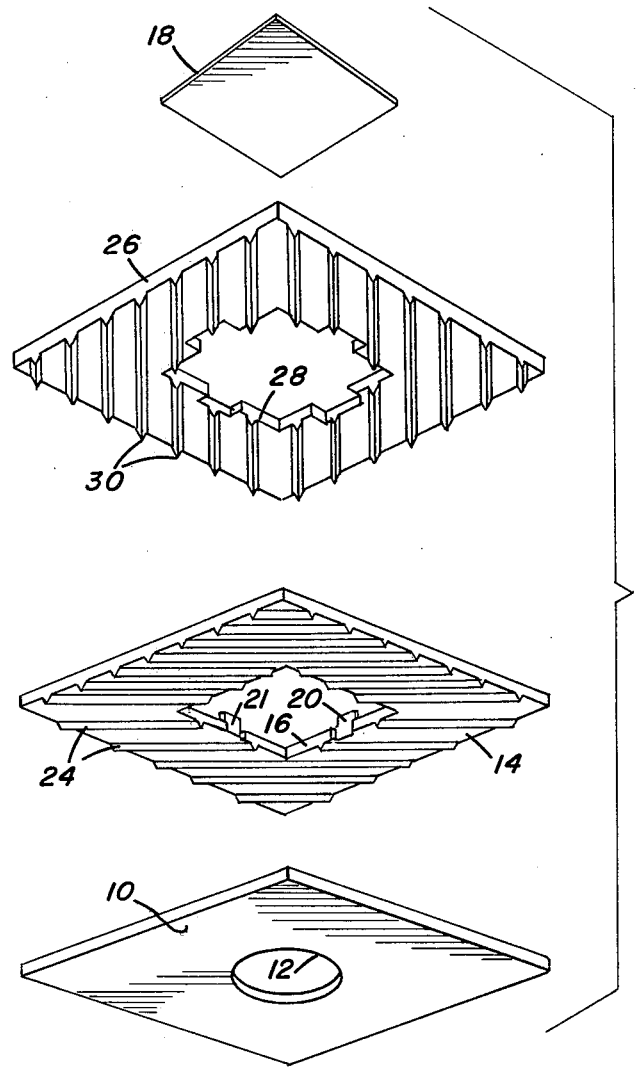
FIG. 1 is a bottom exploded view of a test mount and a test element in accordance with the present invention.

FIG. 1 is an exploded view of a test mount and a test element suitable for use with chemical analysis equipment as described in aforementioned U.S. Pat. No. 3,992,158. The bottommost layer shown in the figure is a sheet 10 of thermoplastic web material such as polystyrene. Other suitable materials might include polypropylene or polyimide depending upon the intended use and desired characteristics. An aperture 12 extends through sheet 10 to permit a drop of test fluid to pass therethrough. Both upper and lower surfaces of sheet 10 are preferably flat.

Figure 2:
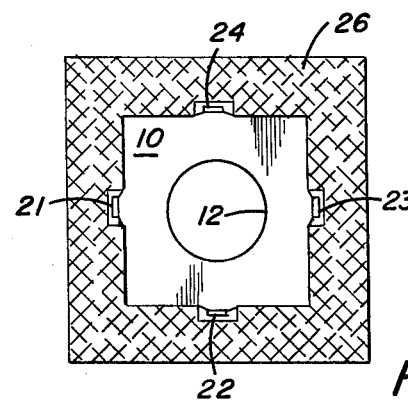
FIG. 2 is a top plan view of the test mount of FIG. 1.

Above sheet 10 in FIG. 1, a second sheet 14 of similar material and size is provided with an aperture 16 shaped to receive an analytical test element 18 of the type hereinbefore described. As best seen in FIG. 2, four tabs 20–23 extend in a direction away from sheet 10. It will be understood from the description which follows that tabs 20–23 are provided to retain test element 18 in aperture 16 and, for that purpose, may be carried on any of the three thermoplastic sheets which are joined to form the test slide mount.

A plurality of energy director elements comprising linear ribs 24 extend from the surface of sheet 14 which faces sheet 10. The ribs may be formed on the sheet during extrusion. When sheets 10 and 14 are brought together, contact is made only between ribs 24 and the flat surface of sheet 10. The ribs are shown as being parallel to each other and as extending diagonally across sheet 14. Conventional flash traps, not shown, may be provided adjacent to the energy director elements to receive excess material when the elements melt.

Above sheet 14 in FIG. 1, is a third sheet 26 of size and material similar to sheets 10 and 14. An aperture 28 extends through sheet 26 and is sized to pass test element 18 for insertion into aperture 16. The walls of sheet 26 which define aperture 28 have recesses to receive tabs 20–23. A plurality of energy director elements in the form of ribs 30 are provided on the surface of sheet 26 which faces sheet 14. Ribs 30 are similar to ribs 24 but are disposed at an angle to ribs 24. As used herein, the phrase "at an angle to" is intended to mean non-parallel to, such that when viewed from above, ribs 30 cross ribs 24. This arrangement is shown in FIG. 2 wherein each broken line is intended to represent one of the ribs. For clarity, the test element is not shown in FIG. 2.

Figure 3:
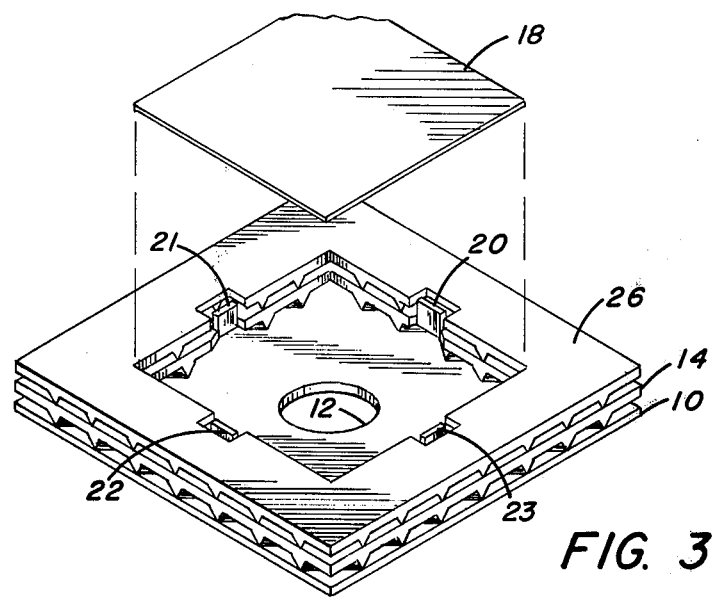
FIG. 3 is a top perspective view of the assembled test mount of FIG. 1 before bonding, with the test element exploded therefrom.
Figure 4:
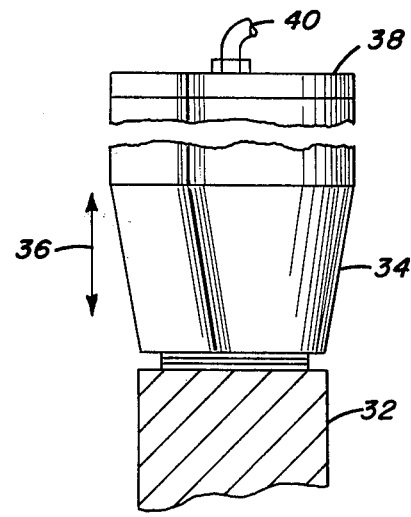
FIG. 4 is a side view of the test mount of the preceding figures clamped between a sonic horn and anvil.

Once fully assembled, as shown in FIG. 3, the test mount and element are placed on an anvil 32 (FIG. 4) below a sonic horn 34 adapted for reciprocating movement toward and away from anvil 32 as indicated by arrow 36. Horn 34 is coupled to a press, of conventional design such as shown in U.S. Pat. No. 3,661,661, for producing between horn 34 and anvil 32, a compressive force holding the assembled mount and test element therebetween. The sonic horn is driven by an electromechanical transducer 38, which produces high frequency vibrations in response to electrical signals via a conductor 40.

The force of the press and the high frequency vibrations will be transmitted between sheets 26 and 14 through ribs 30 and between sheets 14 and 10 through ribs 24. Along each rib 24 or 30, the force transmitted will be greatest at the points where that rib crosses the ribs of the other rib set. Thus, the ribs will serve as energy director elements, concentrating the compressive force at those points during the bonding operation.

Figure 5:
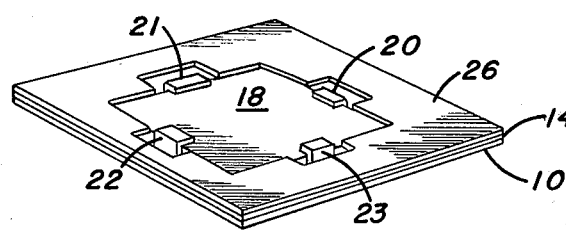
FIG. 5 is a top perspective view of a completed test mount and test element.

When horn 34 is brought into engagement with the assembled mount, vibratory energy is transferred to the mount. Simultaneously, a compressive force urges sheets 10, 14 and 26 into contact with one another so that vibratory energy is dissipated at the locations where energy director elements 24 and 30 cross, or overlap. This condition causes rapid melting and flowing of thermoplastic material. During the initial period of bonding, tabs 20–23 are bent down over the top of test element 18 to secure the element in the mount as shown in FIG. 5.

Upon terminating the vibratory energy, a brief dwell period is provided during which the compressive force is maintained between the sheets. As the thermoplastic material cools, a bond forms, fusing the sheets together. A similar process but without the energy director arrangement of the present invention would produce relatively weak, sporadic weld spots which would take longer to form and/or would be less satisfactory in appearance because of a lack of concentration of vibrational energy during the melting step.

Although the invention has been described with particular reference to a preferred embodiment thereof, it will be readily understood that variations and modifications can be effected within the spirit and scope of the invention as described hereinabove and as defined in the appended claims. For example, while energy director elements 24 and 30 have been described as being integral with sheets 14 and 26 and are shown in the drawings as being straight, it will occur to those skilled in the art that the director elements may be curved (as long as the elements of one set cross those of the other set), may be on other surfaces of the sheets than as shown in the drawings, may be of other than triagonal cross sectional shape, need not be integral with the sheets and need not be of a thermoplastic material.

What is claimed is:

1. The method of bonding together first, second and third thermoplastic sheets using high frequency vibratory energy and elongated energy director elements, said method comprising the steps of:
    positioning said first, second and third sheets and said energy director elements in stacked relationship with a first set of energy director elements between the first and second sheets and a second set of energy director elements between the second and third sheets;
    orienting said energy director elements such that said second set of elements are disposed at an angle to said first set so as to define positions at which said elements of said second set cross said elements of said first set; and
    applying compressive force and high frequency vibratory energy to the stack, whereby the thermoplastic material in the region of said director elements is softened starting at said defined positions and spreading along said elements.

2. The method as defined by claim 1 wherein said compressive force and said vibratory energy are applied for respective time periods which are at least partially co-extensive.

3. The method as defined by claim 1 wherein:
    said compressive force and said vibratory energy are applied for respective time periods which are at least partially co-extensive; and
    said time period for application of said vibratory energy ends before the end of said time period for application of said compressive force.

4. An article of manufacture formed by:
    positioning at least three sheets of thermoplastic web material in juxtaposed, stacked relationship with sets of elongated energy director elements between adjacent sheets, said elements of each set being oriented at an angle with respect to said elements of the next adjacent set so as to define points at which said elements of one set cross said elements of the next adjacent set;

applying a compressive force to said stacked sheets so as to urge said sheets and said director elements into pressure contact, the greatest pressure concentrating at said defined points; and applying high frequency vibratory energy to said stacked sheets to soften the thermoplastic material starting at said points of the greatest pressure concentrations.

5. An article of manufacture as defined in claim 4 further formed by sequentially first terminating said vibratory energy applying step and then terminating said compressive force applying step.

6. An article of manufacture as defined in claim 5 wherein a sufficient time period is provided between terminating said vibratory energy applying step and terminating said compressive force applying step to permit the softened material to harden while the force remains applied.

7. An article of manufacture as defined in claim 4 wherein said energy director elements are linear.

8. An article of manufacture as defined in claim 4 wherein said energy director elements are spaced apart and linear.

9. The method of bonding together three thermoplastic sheets using high frequency vibratory energy and elongated energy director elements, said method comprising the steps of:

positioning said three sheets and said energy director elements in stacked relationship with a first set of at least one energy director element between the middle sheet and one of the outer sheets, and a second set of at least one energy director elements between the middle sheet and the other of the outer sheets.

orienting said energy director elements such that said second element set is disposed at an angle to said first set so as to define positions at which said element of said second set crosses said element of said first set; and applying compressive force and high frequency vibratory energy to the stack, whereby the thermoplastic material in the region of said director elements is softened starting at said defined positions and spreading along said elements.

* * * * *